(12) United States Patent
Yoo et al.

(10) Patent No.: US 11,050,907 B1
(45) Date of Patent: Jun. 29, 2021

(54) DOME FOR SURVEILLANCE CAMERA AND SURVEILLANCE CAMERA INCLUDING THE SAME

(71) Applicant: HANWHA TECHWIN CO., LTD., Seongnam-si (KR)

(72) Inventors: Injung Yoo, Seongnam-si (KR); Ji-Seok Kim, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/861,500

(22) Filed: Apr. 29, 2020

(30) Foreign Application Priority Data

Feb. 24, 2020 (KR) .................. 10-2020-0022513

(51) Int. Cl.
*H04N 5/225* (2006.01)
*H04N 7/18* (2006.01)

(52) U.S. Cl.
CPC ............. *H04N 5/2252* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 2013/0169805 A1* | 7/2013 | Park | H04N 7/185 348/143 |
| 2017/0104951 A1* | 4/2017 | Wada | H02J 50/10 |
| 2017/0331987 A1* | 11/2017 | Kimura | H04N 5/2252 |
| 2018/0356710 A1* | 12/2018 | Bingleman | G08B 13/19632 |
| 2020/0236252 A1* | 7/2020 | Song | H04N 5/23238 |

* cited by examiner

*Primary Examiner* — William B Perkey
(74) *Attorney, Agent, or Firm* — Sughrue Mion, PLLC (57) ABSTRACT

A dome for a surveillance camera and the surveillance camera including the same is provided. The dome may include a spherical part having a hemispherical shape, an aspherical part having a cylindrical shape extending from an end of the spherical part, and a bracket including a first surface coupled to an inner surface of the aspherical part and a second surface extending a curved surface of an inner surface of the spherical part.

20 Claims, 8 Drawing Sheets

FIG. 1

RELATED ART

DOME FOR SURVEILLANCE CAMERA AND SURVEILLANCE CAMERA INCLUDING THE SAME

CROSS-REFERENCE TO THE RELATED APPLICATION

This application is based on and claims priority under 35 U.S.C. § 119 to Korean Patent Application No. 10-2020-0022513, filed on Feb. 24, 2020, in the Korean Intellectual Property Office, the disclosure of which is incorporated by reference herein in its entirety.

BACKGROUND

1. Field

The disclosure relates to a dome for a surveillance camera and a surveillance camera including the same.

2. Description of Related Art

A surveillance camera for security illuminates a surveillance area by using an infrared light source to light up the surveillance area for night surveillance. In general, a dome-type surveillance camera with a clear dome covering and protecting a camera module, an infrared light source, and various components disposed therein is used as the surveillance camera for security.

Figure 1:
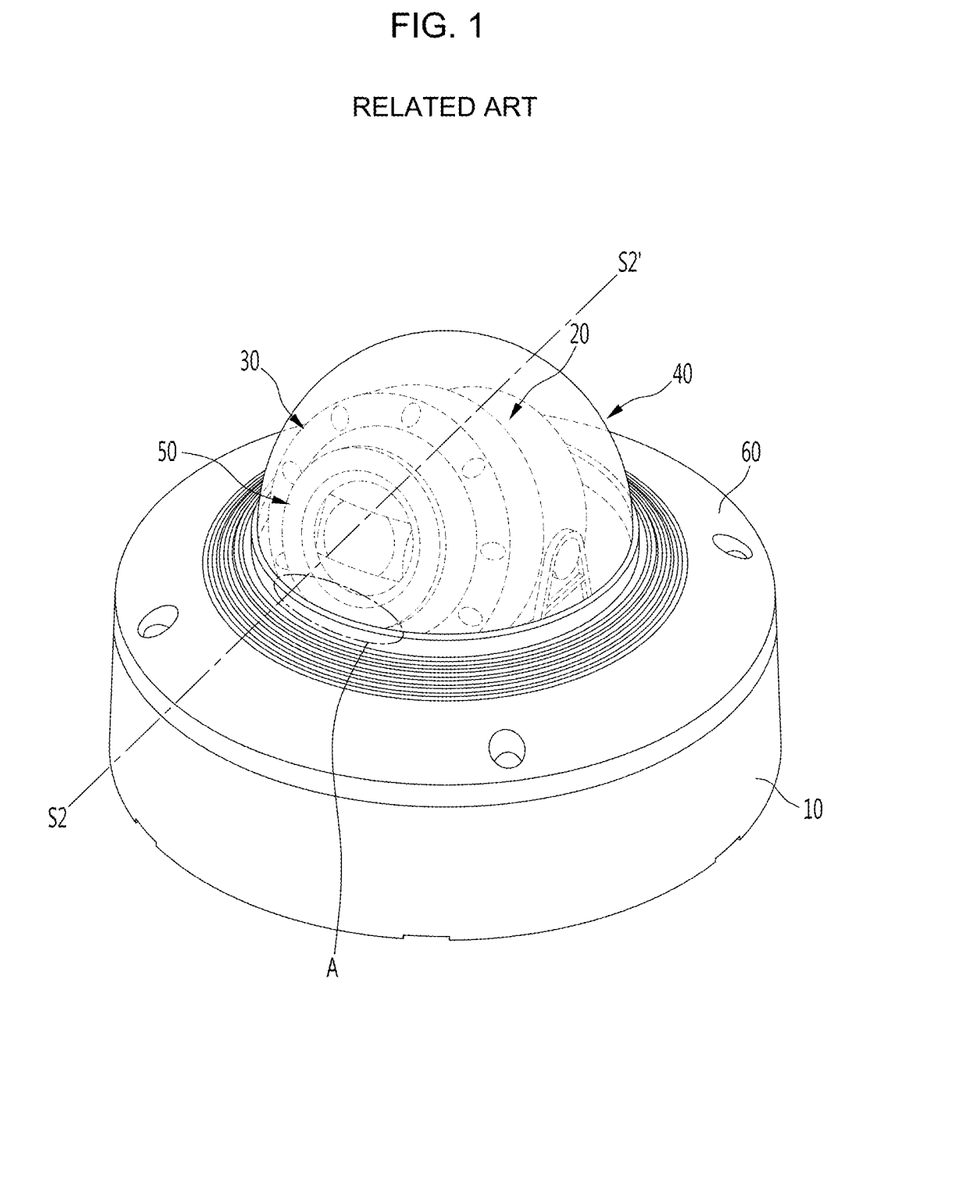
FIG. 1 is a view illustrating a general dome-type surveillance camera.
Figure 2A:
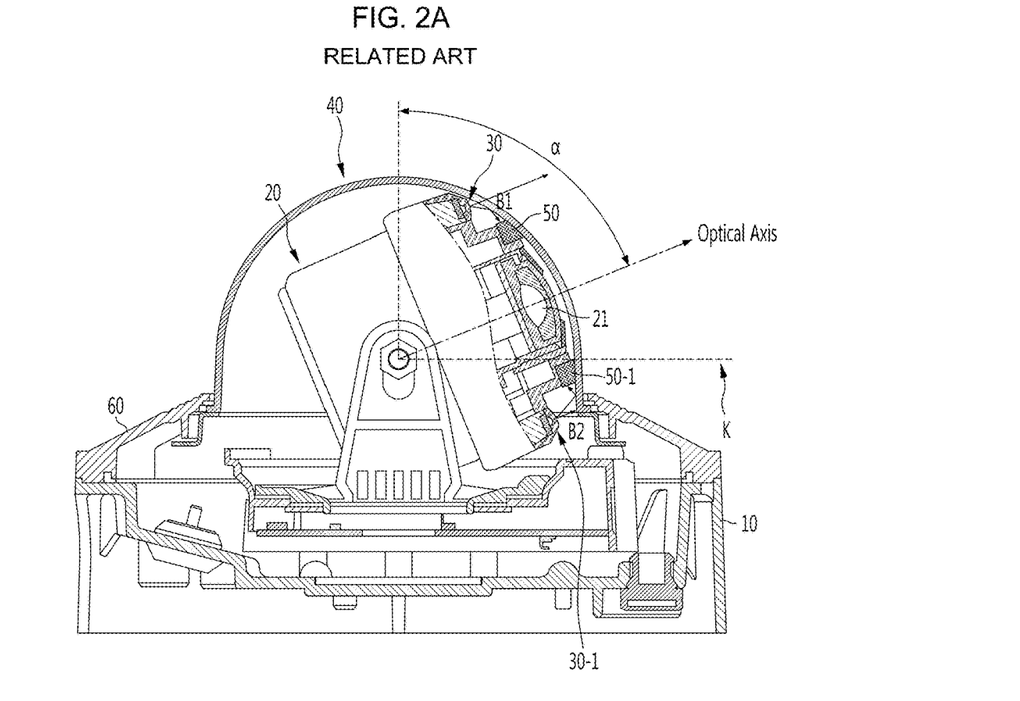
FIGS. 2A-B are cross-sectional views illustrating a general dome-type surveillance camera.
Figure 2B:
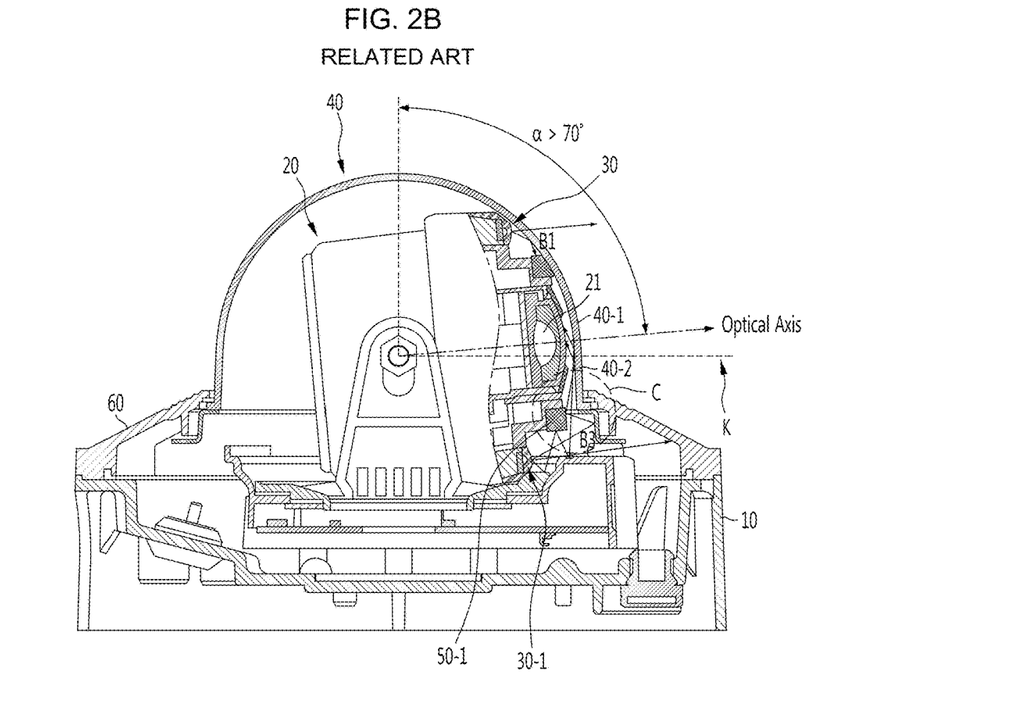

FIGS. 1 and 2 illustrate a general shape of the dome-type surveillance camera. Referring to FIG. 1, the general dome-type surveillance camera includes a camera module 20 installed on a base 10, an infrared light source 30 illuminating a surveillance area of the cameral module 20 with infrared light, a dome 40 covering and protecting inner components including the camera module 20 and the infrared light source 30, an infrared hood 50 preventing infrared light emitted from the infrared light source 30 from being reflected by the dome 40 and entering into a lens 21 of the camera module 20, and a case top 60 fixing the dome 40 to the base 10. Here, the infrared light source 30 is disposed above the lens 21 in FIG. 1. However, the infrared light source 30 may be disposed at the left and the right sides of the lens 21 or disposed to surround the lens 21.

In general, the dome-type surveillance camera captures an image while changing a surveillance area by tilting the camera module 20. As such, since a tilt axis of the camera module 20 passes through the center of a spherical part of the dome 40, when the camera module 20 is tilted at a specific angle and then covered, the infrared hood 50 disposed around the lens 21 maintains its position to be in contact with the inner surface of the dome 40. Thus, the infrared hood 50 prevents infrared light emitted from the infrared light source 30 from being reflected by the dome 40 or being diffused or reflected by other components, and entering into the lens 21 of the camera module 20.

In general, since the dome 40 of the surveillance camera is inevitably manufactured into a hemispherical shape due to certain manufacturing characteristics, the dome 40 includes a spherical part 40-1 having a hemispherical shape and an aspherical part 40-2 having a cylindrical shape formed by extending an end of the spherical part 40-1. FIG. 2B illustrates a boundary line K between the spherical part 40-1 and the aspherical part 40-2. For example, the infrared hood 50 is attached to a surrounding of the lens 21 and is made of an elastic material such as a sponge and an ethylene vinyl acetate copolymer (EVA), which block the infrared light. At the time of manufacture, the infrared hood 50 is pressed by the inner surface of the dome 40 to be firmly fixed to the surrounding of the lens 21.

Accordingly, when the infrared hood 50 moves together with the camera module 20 in a state of being in close contact with the inner surface of the dome 40 as the camera module 20 tilts around its axis, there is no gap between the infrared hood 50 and the dome 40 and the reflected infrared light from the dome 40 is not introduced into the lens 21. However, when a typical dome-type surveillance camera structure operates to have a tilt angle of the camera module 20 greater than 70°, the infrared hood 50 may not be in contact with the inner surface of the dome 40 and may generate a gap between the infrared hood 50 and the dome 40 at a lower portion (area A in FIG. 1) of the dome 40, and the reflected infrared light may be introduced through the generated gap into the lens 21 of the camera module 20.

The infrared light introduced into the lens 21 makes an image of the surveillance area to be foggy, thereby degrading the quality of the surveillance image. Thus, the dome-type surveillance camera is generally designed to operate within the tilt angle of 70° in order to prevent a shot image becoming foggy due to the introduction of the infrared light reflected by the dome 40.

FIG. 2 is a cross-sectional view illustrating a partially cut state of the general dome-type surveillance camera, i.e. a partial cross-sectional view taken along line S2-S2' of FIG. 1. FIG. 2A is a view illustrating a state having a tilt angle less than 70°, and FIG. 2B is a view illustrating a state having a tilt angle greater than 70°.

Referring to FIG. 2A, when the camera module 20 operates within a tilt angle α of 70°, light B1, which is a portion reflected by the dome 40 among infrared light emitted from the infrared light source 30 disposed above the infrared hood 50, may not be introduced to the lens 21 of the camera module 20 because it is blocked by the infrared hood 50. Similarly, light B2, which is a portion reflected by the dome 40 among infrared light emitted from an infrared light source 30-1 disposed below the infrared hood 50-1, may not be introduced to the lens 21 of the camera module 20 because it is blocked by the infrared hood 50-1. However, as illustrated in FIG. 2B, when the camera module 20 operates at a tilt angle α greater than 70°, light B3, which is a portion reflected by the dome 40 among the infrared light emitted from the infrared light source 30-1 disposed below the infrared hood 50-1, may pass through a gap (refer to a portion C in FIG. 2B) generated between the infrared hood 50 and an aspherical part 40-2 and may be introduced to the lens 21.

Figure 3A:
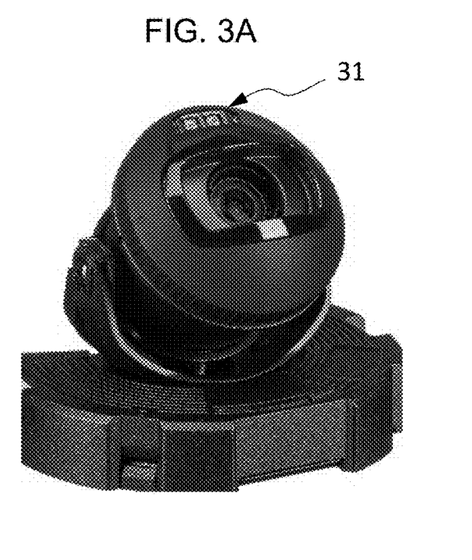
FIGS. 3A and 3C are views illustrating a position of an infrared light source of a dome-type surveillance camera and an example of an image on the basis of the position according to an embodiment.
Figure 3B:
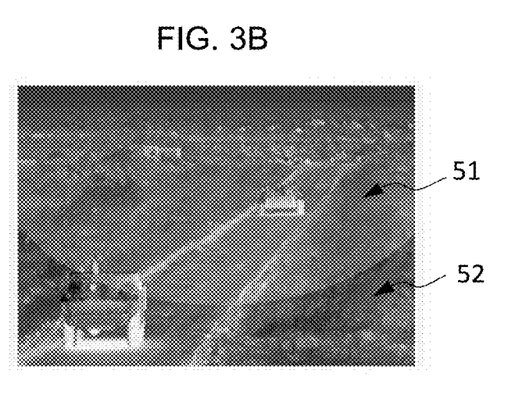
FIGS. 3B and 3D are views illustrating a position of an infrared light source of the general dome-type surveillance camera and an example of an image on the basis of the position.
Figure 3C:
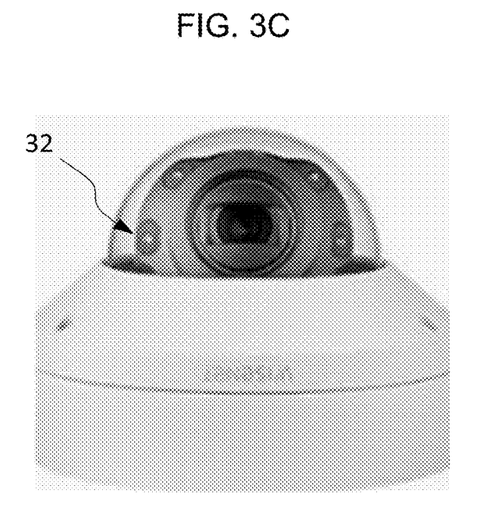
Figure 3D:
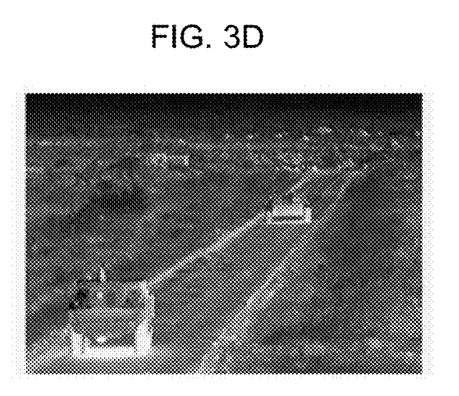

In order to resolve the above-described problem, as illustrated in FIG. 3A, the infrared light source 31 may be disposed at an upper end of the camera module to minimize the reflected infrared light introduced through the gap in FIG. 2. However, since the infrared light is not completely blocked, an upper end 51 of the infrared transmission image may be bright, and a lower end 52 may be dark in the surveillance area as illustrated in FIG. 3B. When the infrared light source 32 is disposed at left and right sides of the camera module as illustrated in FIG. 3C, an entire infrared transmission image of the surveillance area has uniform brightness as illustrated in FIG. 3D. However, when the camera module operates at a tilt angle greater than a specific angle, as described in FIG. 2, an amount of the infrared light introduced through the gap between the infrared hood and the dome increases and degrades the quality of the infrared transmission image of the surveillance area.

According to the related art, a tilt angle of a camera module has been restricted because image quality is degraded by reflected light of infrared light introduced through a gap generated between an infrared hood and a dome when a camera module operates at a tilt angle equal to or greater than a specific angle. However, because of a demand for expanding a surveillance area of a surveillance camera to monitor at an angle equal to or greater than the restricted angle, a technology for extending the tilt angle has become prominent to provide a wide surveillance view without compromising the quality of an image.

In addition, there is an increasing demand for developing a dome-type surveillance camera technology capable of capturing bright and dark images even when the infrared light source is disposed at various positions around the lens without restricting positions of the infrared light source.

SUMMARY

According to an embodiment, there is provided a dome for a surveillance camera including a spherical part having a hemispherical shape; an aspherical part having a cylindrical shape extending from an end of the spherical part; and a bracket including a first surface coupled to an inner surface of the aspherical part and a second surface extending a curved surface of an inner surface of the spherical part.

A center of a sphere of the second surface is the same as a center of a sphere of the inner surface of the spherical part.

A curvature of the second surface is equal to a curvature of the inner surface of the spherical part.

A stepped portion between the inner surface of the spherical part and the second surface is less than or equal to 0.5 mm.

The dome is formed such that the spherical part and the aspherical part are inscribed so as not to generate a boundary therebetween.

The dome further includes a cover reflection preventing part coupled with an outer circumferential surface of the aspherical part of the dome.

According to an embodiment, there is provided a surveillance camera including a camera module configured to capture an image of a surveillance area; an infrared light source configured to illuminate the surveillance area with infrared light; a dome configured to cover the camera module and the infrared light source and including: a spherical part, an aspherical part, and a bracket including a first surface coupled to an inner surface of the aspherical part and a second surface extending a curved surface of an inner surface of the spherical part; and an infrared hood coupled with the camera module to contact the inner surface of the spherical part or at least a portion of the second surface of the bracket.

A curvature of the second surface of the bracket is equal to a curvature of the inner surface of the spherical part.

The infrared hood contacts an inner surface of the dome within a tilt angle of the camera module.

A stepped portion between the inner surface of the spherical part of the dome and the second surface of the bracket is less than or equal to 0.5 mm.

The infrared hood surrounds a lens to spatially separate the lens from the infrared light source.

The dome is formed such that the spherical part and the aspherical part are inscribed so as not to generate a boundary therebetween.

The surveillance camera further includes a cover reflection preventing part coupled with an outer circumferential surface of the aspherical part of the dome.

A center of a sphere of the second surface is the same as a center of a sphere of the inner surface of the spherical part.

According to an embodiment, there is provided a surveillance camera including: a camera module configured to capture an image of a surveillance area; an infrared light source configured to illuminate the surveillance area with infrared light; a dome including a spherical part having a hemispherical shape, an aspherical part having a cylindrical shape extending from an end of the spherical part, a bracket having a first surface coupled to an inner surface of the aspherical part and a second surface extending a curved surface of an inner surface of the spherical part while maintaining a curvature of the inner surface of the spherical part; and an infrared hood coupled with the camera module to contact the inner surface of the spherical part or at least a portion of the second surface of the bracket, the infrared hood contacts an inner surface of the dome within a tilt angle of the camera module.

The infrared hood surrounds a lens to spatially separate the lens from the infrared light source.

A stepped portion between the inner surface of the spherical part and the second surface of the bracket is less than or equal to 0.5 mm.

The dome is formed such that a boundary between the spherical part and the aspherical part is inscribed.

The surveillance camera further includes: a base configured to support the camera module; a case top configured to fix the dome to the base; and a cover reflection preventing part coupled with an outer circumferential surface of the aspherical part of the dome.

A center of a sphere of the second surface is the same as a center of a sphere of the inner surface of the spherical part.

According to the embodiments, it is possible to extend the tilt angle of the surveillance camera while preventing image quality degradation due to reflected infrared light.

According to the embodiments, even when an infrared light source is disposed at various positions around the lens of the camera module, a surveillance camera may capture a clear, high-quality night vision image.

According to the embodiments, an area of the spherical portion of the dome may be easily expanded.

However, the above-described embodiments are not limited thereto, and the embodiments may include other aspects, features and effects that may be clearly understood by those skilled in the art.

BRIEF DESCRIPTION OF THE DRAWINGS

The above and other aspects, features, and advantages of certain embodiments of the disclosure will be more apparent from the following description, taken in conjunction with the accompanying drawings, in which.

DETAILED DESCRIPTION

The embodiments of the disclosure may be applied to a dome of a surveillance camera and a dome-type surveillance camera including a dome. However, it may be understood that the embodiments are not limited to a specific embodiment, but may include various modifications, equivalents, and substitutions without departing from the scope and spirit of the disclosure, and should not be construed as being limited to the embodiments set forth herein.

It will be understood that although the terms first and second are used herein to describe various elements, these elements should not be limited by these terms. In addition, general terms widely currently used have been selected to describe the embodiments. In a specific case, terms may be arbitrarily selected. In this case, since the meaning of the terms will be described in detail, and the disclosure should be understood in the context of such terms, not by the simple names of such terms. Unless otherwise indicated, all terms including technical and scientific terms used herein have the same meaning as generally understood by those skilled in the art. Terms as defined in a commonly used dictionary should be construed as having the same meaning as in an associated technical context, and unless defined otherwise, the terms are not ideally or excessively construed as having formal meaning.

It will be understood that although the terms of first and second are used herein to describe various elements, these elements should not be limited by these terms. The terms are only used to distinguish one component from other components. For example, a first element referred to as a first element in one embodiment can be referred to as a second element in another embodiment.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Spatially relative terms, such as "beneath," "below," "lower," "under," "on," "over," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Hereinafter, embodiments of the disclosure are described with reference to the accompanying drawings, and the same or corresponding components are given the same drawing number regardless of reference number, and their duplicated description will be omitted.

Moreover, detailed descriptions related to well-known functions or configurations will be omitted in order to avoid unnecessarily obscuring subject matters of the disclosure.

Hereinafter, a dome for a surveillance camera and a surveillance camera including the same according to an embodiment will be described with reference to the accompanying drawings.

Figure 4A:
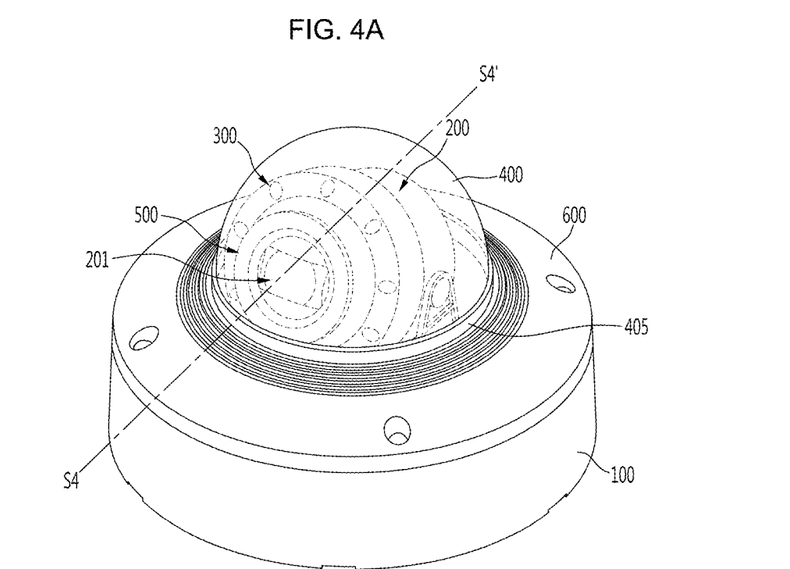
FIG. 4A is a perspective view illustrating a surveillance camera according to an embodiment.
Figure 4B:
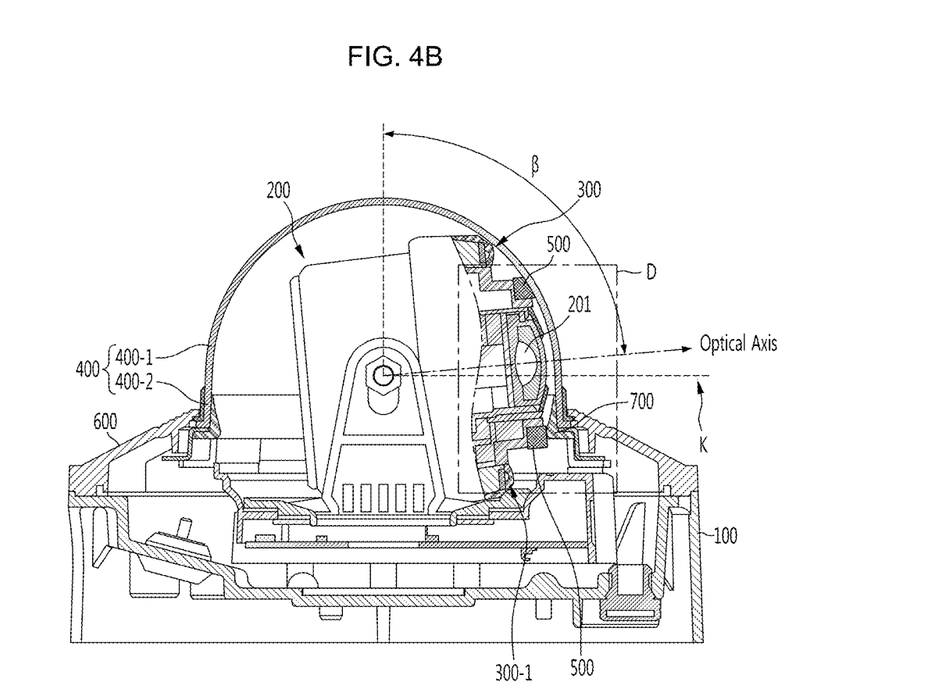
FIG. 4B is a cross-sectional view illustrating a surveillance camera according to an embodiment.

FIG. 4 is a view illustrating the surveillance camera according to an embodiment. FIG. 4A is a perspective view illustrating the surveillance camera according to an embodiment, and FIG. 4B is a partial cross-sectional view illustrating a state in which the surveillance camera according to an embodiment taken along the line S4-S4' in FIG. 4A.

Figure 5:
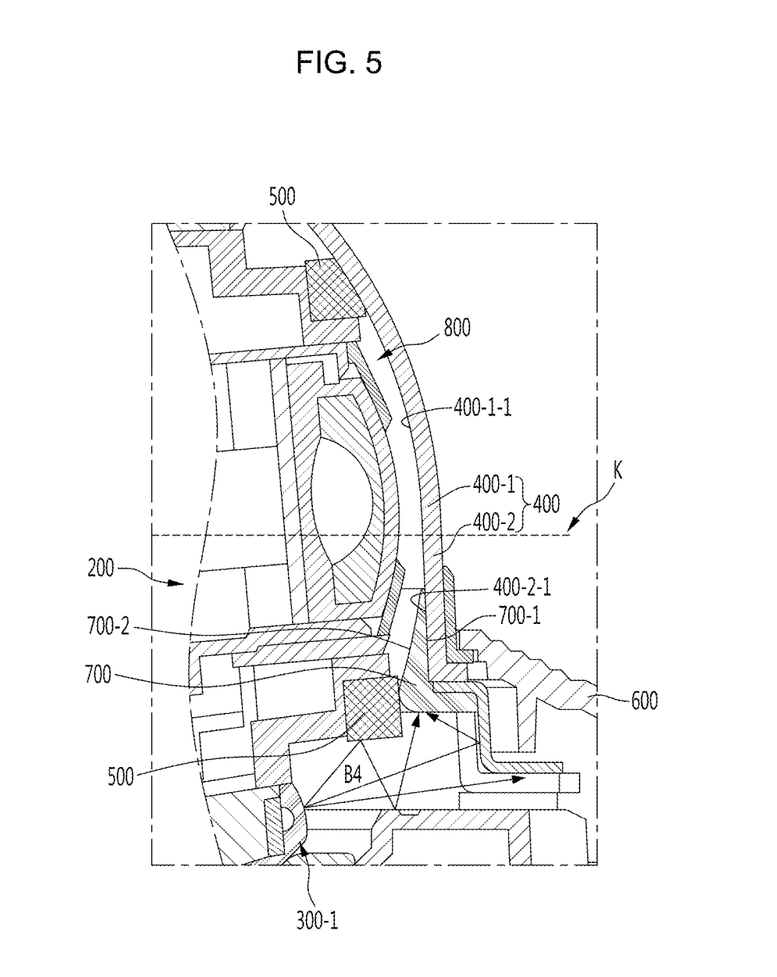
FIG. 5 is an enlarged view illustrating an area D of FIG. 4B according to an embodiment.

FIG. 5 is an enlarged view illustrating an area D of FIG. 4B according to an embodiment.

Referring to FIGS. 4 and 5, a surveillance camera may include a base 100, a camera module 200, an infrared light source 300, a dome 400, an infrared hood 500, and a case top 600 fixing the dome 400 to the base 100.

The camera module 200 is installed on the base 100 and fixed thereto while the dome 400 covers inner components.

The camera module 200 may capture a surveillance area and acquire an image corresponding to the surveillance area.

Infrared light sources 300 and 300-1 may be disposed around a lens 201 of the camera module 200 to surround the lens 201 as illustrated in FIG. 4A. The infrared light sources 300 and 300-1 may illuminate the surveillance area with infrared light so that the camera module 200 may acquire an image of a dark surveillance area.

The dome 400 may cover and protect the inner components including the camera module 200 and the infrared light sources 300 and 300-1. Also, the dome 400 may be made of a transparent material and may allow infrared light emitted from the infrared light sources 300 and 300-1 to be transmitted outside the dome 400 while allowing external light to be transmitted inside the dome 400, so that the camera module 200 may capture an image of the surveillance area.

Also, the dome 400 may include a spherical part 400-1 having a hemisphere shape and an aspherical part 400-2 having a cylindrical shape, and an end of the spherical part 400-1 may extend to form the cylindrical aspherical part 400-2. A reference numeral K in FIGS. 4 to 8 represents a boundary line between the spherical part 40-1 and 400-1, and the aspherical part 40-2 and 400-2.

A bracket 700 may have an outer circumferential surface formed in a cylindrical shape so that a portion 700-1 of the outer circumferential surface contacts and is coupled to an inner surface 400-2-1 of the aspherical part 400-2, and an inner circumferential surface formed such that the inner circumferential surface of a portion 700-2 extends to a curved surface of an inner surface 400-1-1 of the spherical part 400-1. Thus, a center of a sphere extending the portion 700-2 of the inner circumferential surface of the bracket 700 has the same curvature as that of a center of a sphere extending the inner surface 400-1-1 of the spherical part 400-1 of the dome 400. In other words, the curvature of the portion 700-2 of the inner circumferential surface of the bracket 700 and the curvature of the inner surface 400-1-1 of the spherical part 400-1 are the same, and therefore, the portion 700-2 of the inner circumferential surface of the bracket 700 and the inner surface 400-1-1 of the spherical part 400-1 may form a spherical surface. In addition, the bracket 700 may form a spherical surface by substantially extending the spherical part 400-1 of the hemispherical dome 400 further into the aspherical part 400-2 which has a hemispherical shape. The infrared hood 500 may be an elastic body having a ring shape surrounding the lens 201 of the camera module and coupled with the camera module 200 to move in conjunction with the camera module 200 when the camera module 200 is tilted. Thus, when the camera module 200 is tilted at a specific angle and then covered by the dome 400, the infrared hood 500 disposed around the lens 201 may always maintain a state of closely contacting an inner surface of the dome 400. An optical axis of the lens 201 of the camera module 200 passes a tilt axis of the camera module 200, the tilt axis passes a center of a sphere extended in a state of maintaining a curvature of the inner surface 400-1-1 of the spherical part 400-1. Thus, when the camera module 200 is tilted at a specific angle and then covered by the dome 400, the infrared hood 500 disposed around the lens 201 may closely contact the inner surface of the dome 400. That is, the infrared hood 500 may always maintain a state of closely contacting the inner surface 400-1-1 of the spherical part 400-1 and the portion 700-2 of the inner circumferential surface of the bracket 700 within a specific tilt angle. Also, when a user tilts the camera module 200 in a state in which the dome 400 is coupled to the base 100, the infrared hood 500 may slide while maintaining the state of closely contacting the inner surface of the dome 400 (e.g., the inner surface 400-1-1 of the spherical part 400-1 and the portion 700-2 of the inner circumferential surface of the bracket 700). That is, the infrared hood 500 may maintain the state of closely contacting the portion 700-2 of the inner circumferential surface of the bracket 700 even when the camera module 200 is tilted by a tilt limit angle β, where the tilt limit angle R of the camera module 200 is greater than a tilt limit angle α according to the related art shown in FIG. 2B. For example, the tilt limit angle of the surveillance camera according to the embodiment may be up to 85°. Since the bracket 700 forms a spherical surface extending further into the hemisphere-shaped spherical part 400-1 of the dome 400, the infrared hood 500 may slide more smoothly as the camera module 200 tilts and maintain the state of closely contacting the spherical part 400-1 of the dome 400 even when the camera module 200 is tilted at an angle greater than that of the angle α of the related art.

Thus, the surveillance camera according to an embodiment may block reflected light B4 of the infrared light introduced into the lens 201 because the infrared hood 500 prevents the infrared light emitted from the infrared light sources 300 and 300-1 from being reflected by the inner surface of the dome 400 and entering into the lens 201 even when the camera module 200 is tilted at an angle that is greater than the tilt limit angle α of the related art. Furthermore, referring to FIG. 5, the reflected light B4 of the infrared light blocked by the infrared hood 500 and the bracket 700 may travel such that the infrared light emitted from the light source 300-1 disposed below the camera module 200 is reflected by all sorts of components in the dome 400 without entering into the lens 201. That is, the infrared hood 500 may spatially separate the lens 201 and the infrared light sources 300 and 300-1 within the tilt limit angle β of the camera module 200 by surrounding the lens 201 to block any gap between the lens 201 and the infrared light sources 300 and 300-1.

As a result, as the bracket 700 extends the spherical surface formed on the inner surface 400-1-1 of the spherical part 400-1 of the dome 400, a section in which the infrared hood 500 closely contacts the inner surface of the dome 400 may be expanded. That is, the bracket 700 may expand the tilt limit angle of the camera module 200 further than that of the related art.

The surveillance camera according to an embodiment may be connected to a wired or wireless network to perform communication with another device. The surveillance camera may be referred to as closed-circuit television (CCTV) and transmit an image obtained through the network to a management device. Here, the surveillance camera may be a camera including a lens and an image sensor. The lens may be a lens group including at least one piece of lens. The image sensor may convert an image inputted by the lens into an electrical signal. For example, the image sensor may be a semiconductor device such as a charge-coupled device (CCD) or a complementary metal oxide semiconductor (CMOS), which is capable of converting an optical signal into an electrical signal (hereinafter, referred to as an image). Alternatively, the surveillance camera may be a camera providing an image including RGB of a target space to be captured, an infrared image, or a distance image including distance information.

The management device may store and manage an image transmitted by the surveillance camera. According to an embodiment, one or more management devices may be provided. The management device may include various units capable of storing information processed in electronic communication equipment and providing the stored information again. For example, the management device may be realized in one type of a video management system (VMS), a central management system (CMS), a network video recorder (NVR), and a digital video recorder (DVR). Alternatively, the management device may be a personal computer, a server, or a portable terminal. However, this is merely an example. The embodiment of the disclosure is not limited thereto. For example, the management device may include various devices capable of receiving a multimedia object from one or more surveillance camera through a network and displaying and/or storing the received multimedia object.

The network may include a wireless network, a wired network, a public network such as internet, a private network, a global system for mobile communication network (GSM), a general packet radio network (GPRN), a local area network (LAN), a wide area network (WAN), a metropolitan area network (MAN), a cellular network, a public switched telephone network (PSTN), a personal area network), Bluetooth, Wi-Fi direct, near field communication, an ultrawide band, a combination thereof, or any network communication method. However, the embodiment of the disclosure is not limited thereto.

Figure 6A:
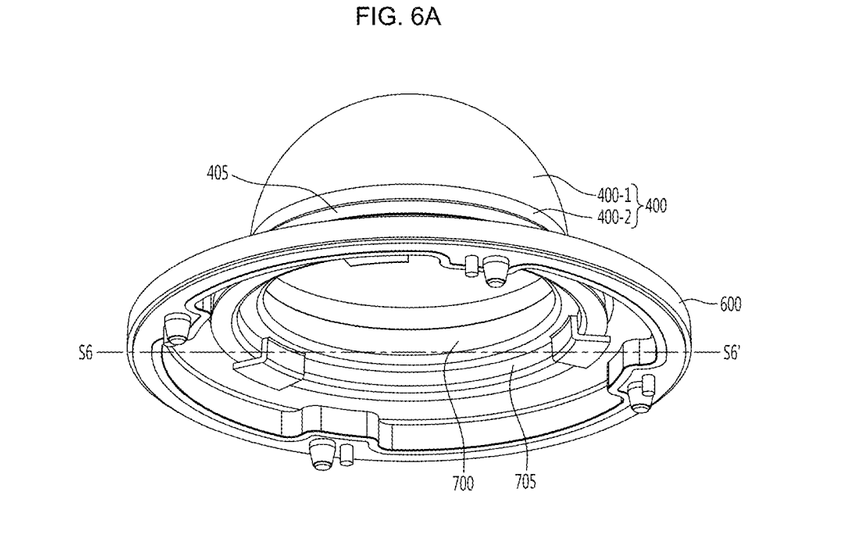
FIGS. 6A and 6B are views illustrating a dome for a surveillance camera according to an embodiment.
Figure 6B:
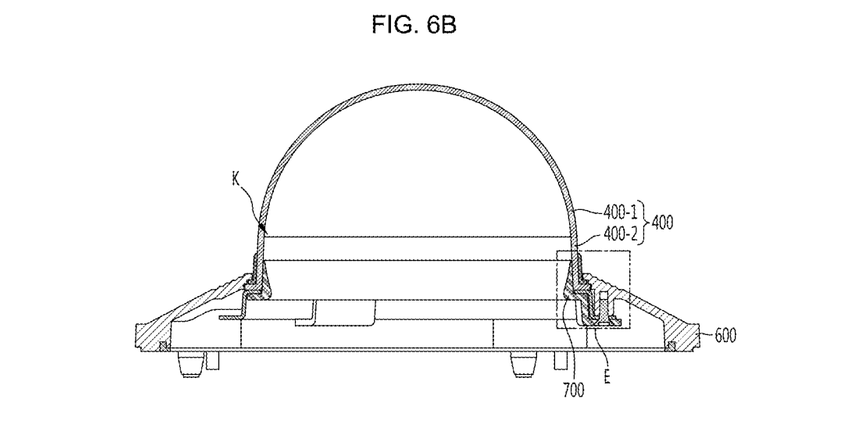

FIG. 6 is a view illustrating a dome for a surveillance camera according to an embodiment. FIG. 6A is a perspective view illustrating the dome for the surveillance camera according to an embodiment, and FIG. 6B is a cross-sectional view taken along the line S6-S6' of FIG. 6A.

Figure 7:
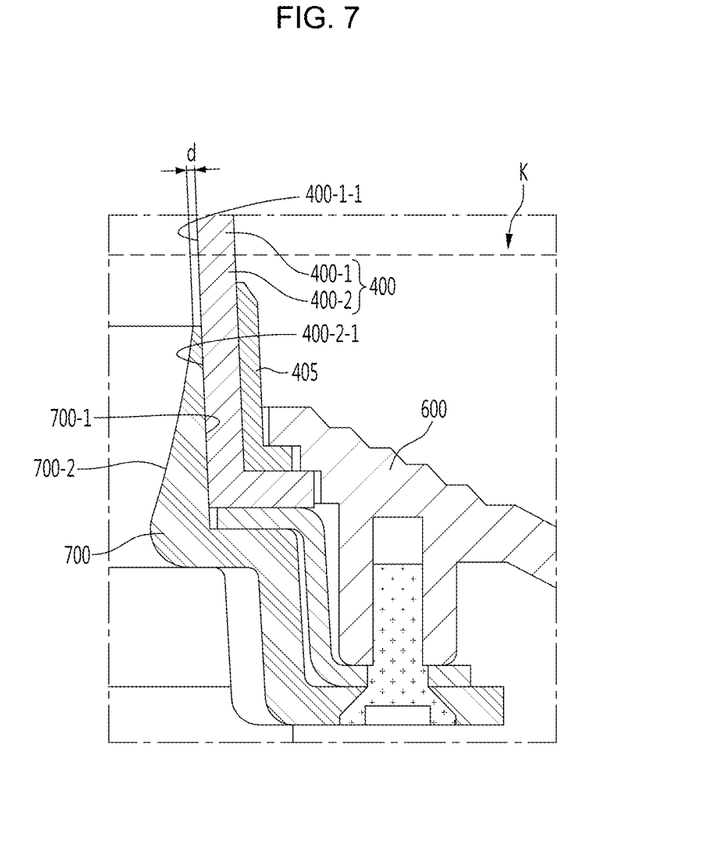
FIG. 7 is an enlarged view illustrating an area E of FIG. 6B according to an embodiment.

FIG. 7 is an enlarged view illustrating an area E of FIG. 6B according to an embodiment.

Referring to FIGS. 4 to 7, a dome 400 for a surveillance camera according to an embodiment covers and protects inner components as described above. The dome 400 may include a spherical part 400-1 having a hemispherical shape, an aspherical part 400-2 having a cylindrical shape extending from an end of the spherical part 400-1, and a bracket 700 formed such that a portion 700-1 of an outer circumferential surface is coupled to an inner surface 400-2-1 of the aspherical part 400-2, and a portion 700-2 of an inner circumferential surface is formed so that a curved surface including an inner surface 400-1-1 of the spherical part 400-1 is extended.

Also, the dome 400 may be partially fixed to a case top 600 by using a fixing bracket 705, and the case top 600 may firmly couple the dome 400 to the base 100 (refer to FIG. 4) of the surveillance camera.

Also, the dome 400 may include a cover reflection preventing part 405. The cover reflection preventing part 405 may be coupled with a lower end external area of the spherical part 400-1 or the aspherical part 400-2 of the dome 400 to prevent infrared light reflected by a surface of the case top 600 from being introduced into a lens.

Also, when the infrared hood 500 is in close contact with a boundary portion between the inner surface 400-1-1 of the spherical part 400-1 and the portion 700-2 of an inner circumferential surface of the bracket, the infrared light may be introduced through a gap between the dome 400 and the bracket 700. In order to prevent this, referring to FIG. 7, a stepped portion (d) between the inner surface 400-1-1 of the spherical part 400-1 and the portion 700-2 of the inner circumferential surface of the bracket 700 may be formed such that the stepped portion (d) is less than or equal to 0.5 mm.

FIG. 8 is an enlarged view illustrating a boundary portion between the spherical part and the aspherical part of the dome for the surveillance camera and an example of an image obtained including the boundary portion.

Figure 8A:
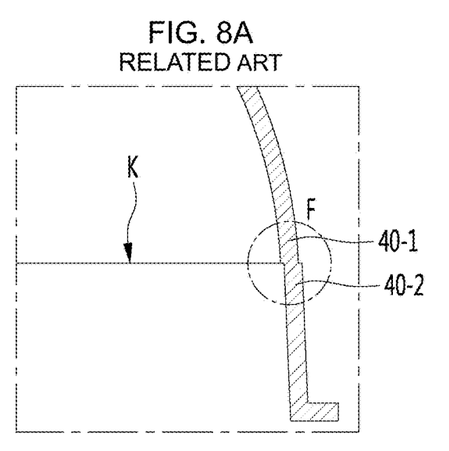
FIGS. 8A and 8C are an enlarged view illustrating a boundary portion between a spherical part and an aspherical part of a general dome for a surveillance camera and an example of an image obtained by shooting the boundary portion.

FIG. 8A is an enlarged view illustrating a boundary portion (refer to an area F) between the spherical part 40-1 and the aspherical part 40-2 of the dome 40 for the surveillance camera according to the related art. As a stepped portion is generated at the boundary portion, or the boundary portion is not smoothly connected, a degradation in image quality such as an image including a stripe at a portion corresponding to the boundary portion is generated.

Figure 8B:
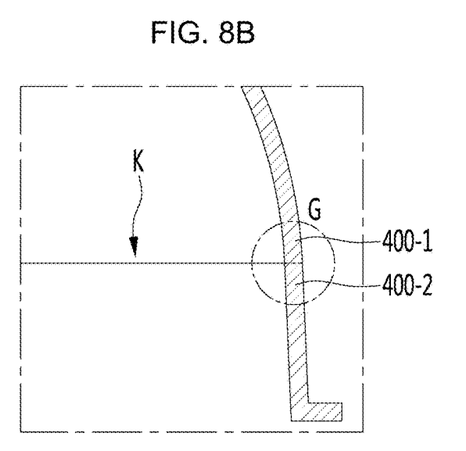
FIGS. 8B and 8D are an enlarged view illustrating a boundary portion between a spherical part and an aspherical part of a general dome for a surveillance camera and an example of an image obtained by shooting the boundary portion according to an embodiment.
Figure 8C:
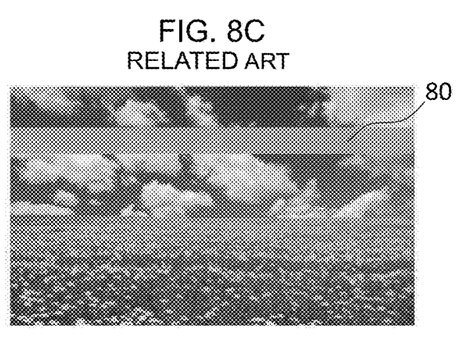

FIG. 8B is an enlarged view illustrating a boundary portion (refer to an area G) between the spherical part 400-1 and the aspherical part 400-2 of the dome for the surveillance camera according to an embodiment of the disclosure. The dome 400 is formed such that a stepped portion between the spherical part 400-1 and the aspherical part 400-2 is not formed, and a connected portion is smooth.

Figure 8D:
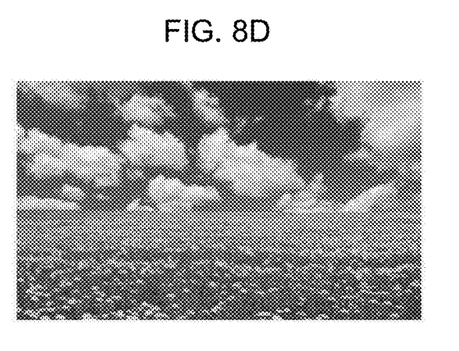

Here, the dome 400 is manufactured by performing a diamond turning machine (DTM) process on the boundary portion so that the boundary between the spherical part 400-1 and the aspherical part 400-2 is not distinguished. By processing as described above, even when the camera module is tilted at a tilt angle of 70° or more, the surveillance camera may capture an entire surveillance screen area without any defect, as shown in FIG. 8D.

The term "module" used in the various embodiments of the disclosure, for example, may means a unit including one or more combinations of hardware, software, and firmware. For example, such a "module" may be interchangeably used as a unit, a logic, a logical block, a component, or a circuit. The "module" may be the smallest unit or a portion of the integrated components. The "module" may be the smallest unit or a portion of the component that performs at least one function. The "module" may be mechanically or electrically implemented.

The embodiments may provide the effect of extending the tilt angle of the surveillance camera and preventing the degradation in image quality due to the reflected infrared light.

Also, the embodiments may provide the effect of capturing a night surveillance image with distinct and high quality even when the infrared light source is disposed at various positions around the lens of the camera module.

Also, the embodiments may provide the effect of easily expanding the area of the spherical part in the dome of the surveillance camera.

However, the object of the present disclosure is not limited to the foregoing, but may include other objects not described herein that may be clearly understood by those skilled in the art.

Even though all the elements of the embodiments are coupled to one or operated in the combined state, the present disclosure is not limited to such an embodiment. That is, all the elements may be selectively combined with each other without departing the scope of the disclosure. Furthermore, when it is described that one comprises (or includes or has) some elements, it should be understood that it may comprise (or include or has) only those elements, or it may comprise (or include or have) other elements as well as those elements unless indicated otherwise.

Furthermore, unless defined otherwise, all terms including technical or scientific terms are to be given meanings understood by those skilled in the art. Like terms defined in dictionaries, generally used terms may be construed as including meaning used in technical contexts and may not be construed as ideal or excessively formal meanings unless otherwise clearly defined herein.

Although the embodiments of the disclosure have been described, it is understood that the embodiments of the disclosure should not be limited to the embodiments herein, but various changes and modifications may be made by one ordinary skilled in the art within the spirit and scope of the disclosure.

What is claimed is:

1. A dome for a surveillance camera, the dome comprising:
   a spherical part having a hemispherical shape;
   an aspherical part having a cylindrical shape extending from an end of the spherical part; and
   a bracket including a first surface coupled to an inner surface of the aspherical part and a second surface extending a curved surface of an inner surface of the spherical part.

2. The dome of claim 1, wherein a center of a sphere of the second surface is the same as a center of a sphere of the inner surface of the spherical part.

3. The dome of claim 2, wherein a curvature of the second surface is equal to a curvature of the inner surface of the spherical part.

4. The dome of claim 1, wherein a stepped portion between the inner surface of the spherical part and the second surface is less than or equal to 0.5 mm.

5. The dome of claim 1, wherein the spherical part and the aspherical part are inscribed so as not to generate a boundary therebetween.

6. The dome of claim 1, further comprising a cover reflection preventing part coupled with an outer circumferential surface of the aspherical part of the dome.

7. A surveillance camera comprising:
a camera module configured to capture an image of a surveillance area;
an infrared light source configured to illuminate the surveillance area with infrared light;
a dome configured to cover the camera module and the infrared light source and comprising:
a spherical part,
an aspherical part, and
a bracket including a first surface coupled to an inner surface of the aspherical part and a second surface extending a curved surface of an inner surface of the spherical part; and
an infrared hood coupled with the camera module to contact the inner surface of the spherical part or at least a portion of the second surface of the bracket.

8. The surveillance camera of claim 7, wherein a curvature of the second surface of the bracket is equal to a curvature of the inner surface of the spherical part.

9. The surveillance camera of claim 8, wherein the infrared hood contacts an inner surface of the dome within a tilt angle of the camera module.

10. The surveillance camera of claim 7, wherein a stepped portion between the inner surface of the spherical part of the dome and the second surface of the bracket is less than or equal to 0.5 mm.

11. The surveillance camera of claim 7, wherein the infrared hood surrounds a lens to spatially separate the lens from the infrared light source.

12. The surveillance camera of claim 7, wherein the dome is formed such that the spherical part and the aspherical part are inscribed so as not to generate a boundary therebetween.

13. The surveillance camera of claim 7, further comprising a cover reflection preventing part coupled with an outer circumferential surface of the aspherical part of the dome.

14. The surveillance camera of claim 7, wherein a center of a sphere of the second surface is the same as a center of a sphere of the inner surface of the spherical part.

15. A surveillance camera comprising:
a camera module configured to capture an image of a surveillance area;
an infrared light source configured to illuminate the surveillance area with infrared light;
a dome comprising:
a spherical part having a hemispherical shape,
an aspherical part having a cylindrical shape extending from an end of the spherical part,
a bracket having a first surface coupled to an inner surface of the aspherical part and a second surface extending a curved surface of an inner surface of the spherical part while maintaining a curvature of the inner surface of the spherical part; and
an infrared hood coupled with the camera module to contact the inner surface of the spherical part or at least a portion of the second surface of the bracket,
wherein the infrared hood contacts an inner surface of the dome within a tilt angle of the camera module.

16. The surveillance camera of claim 15, wherein the infrared hood surrounds a lens to spatially separate the lens from the infrared light source.

17. The surveillance camera of claim 15, wherein a stepped portion between the inner surface of the spherical part and the second surface of the bracket is less than or equal to 0.5 mm.

18. The surveillance camera of claim 15, wherein the dome is formed such that a boundary between the spherical part and the aspherical part is inscribed.

19. The surveillance camera of claim 15, further comprising:
a base configured to support the camera module;
a case top configured to fix the dome to the base; and
a cover reflection preventing part coupled with an outer circumferential surface of the aspherical part of the dome.

20. The surveillance camera of claim 15, wherein a center of a sphere of the second surface is the same as a center of a sphere of the inner surface of the spherical part.

* * * * *